United States Patent [19]

Johnson

[11] Patent Number: 4,581,087
[45] Date of Patent: Apr. 8, 1986

[54] METHOD OF MAKING A THERMOPLASTIC ADHESIVE-COATED TAPE

[75] Inventor: David A. Johnson, Danvers, Mass.
[73] Assignee: The Kendall Company, Boston, Mass.
[21] Appl. No.: 463,781
[22] Filed: Feb. 4, 1983
[51] Int. Cl.³ ............................................. B32B 31/16
[52] U.S. Cl. .................................... 156/209; 128/156; 156/219; 156/252; 156/253; 428/43
[58] Field of Search ............... 156/209, 219, 220, 252, 156/253; 128/156; 83/30; 428/43

[56] References Cited

U.S. PATENT DOCUMENTS

| | | | |
|---|---|---|---|
| 1,967,923 | 7/1934 | Connolly | 156/252 |
| 2,636,297 | 4/1953 | Johnson | 156/253 |
| 3,053,252 | 9/1962 | Wolf | 128/156 |
| 3,073,304 | 1/1963 | Schaar | 156/252 |
| 3,085,024 | 4/1963 | Blackford | 428/43 |
| 3,143,208 | 8/1964 | Sizemore | 428/43 |
| 3,457,919 | 7/1969 | Harbard | 128/156 |
| 3,794,554 | 2/1974 | Caring | 428/43 |
| 3,985,600 | 10/1976 | Blais | 156/252 |

FOREIGN PATENT DOCUMENTS

| | | | |
|---|---|---|---|
| 756383 | 9/1956 | United Kingdom | 156/253 |
| 936448 | 9/1963 | United Kingdom | 156/253 |

Primary Examiner—Caleb Weston
Attorney, Agent, or Firm—Donald N. Halgren

[57] ABSTRACT

The present invention discloses an adhesive-coated thermoplastic film tape that is readily hand-tearable which comprises an elongate flexible thermoplastic film base having a suitable pressure-sensitive adhesive coated onto one surface thereof. The adhesive-coated thermoplastic film base incorporates a plurality of oriented discrete perforations substantially throughout its entire structure.

The non-adhesive-coated surface may further be configured with a plurality of discrete depressions or embossments impressed thereon.

A method of producing the novel adhesive-coated thermoplastic film tape discussed above is also described.

1 Claim, 8 Drawing Figures

METHOD OF MAKING A THERMOPLASTIC ADHESIVE-COATED TAPE

BACKGROUND OF THE INVENTION

The present invention relates to improvements in adhesive-coated tapes.

The present invention further relates to improved adhesive-coated thermoplastic tapes.

The present invention more particularly relates to adhesive-coated thermoplastic tapes having improved hand tearability characteristics.

The present invention most particularly relates to adhesive-coated thermoplastic tapes that are both perforated and embossed for improved hand tearability.

It is often necessary for adhesive-coated tapes that are designed for such purposes as packaging, sealing, or similar purposes, to possess a high tensile strength. For this, and other reasons, thermoplastic film, reinforced cloth and/or paper, having a high tensile strength, have been used frequently as the substrate materials in prior art adhesive-coated tapes.

Due to the requisite high tensile strength of the thermoplastic film substrate material, cutting implements such as knives, scissors or tape dispensers, have been necessarily employed to remove sections of an adhesive-coated thermoplastic film tape from a storage roll during use. The requirement of a cutting implement when using prior art thermoplastic film adhesive-coated tapes makes their use in packaging, sealing, etc. also quite inconvenient and inefficient.

Additionally, the majority of adhesive-coated thermoplastic polymer tape webs possess a longitudinally-oriented molecular configuration. Hand tearing of most thermoplastic tapes of the prior art is thus a very difficult operation to perform. In fact, attempts at transverse hand tearing of these thermoplastic film prior art tapes results generally in undesirable adhesive tape stretching in the longitudinal direction, with a generally unattachable and distorted tape edge.

The present invention provides ready, easy hand-tearability of an adhesive-coated thermoplastic polymer tape by providing a plurality of "oriented" discrete perforations incorporated within the thermoplastic film substrate, along with an overlaid pattern of embossing of the non-adhesive-coated surface of the thermoplastic film substrate.

The above-described configuration allows for instant, highly efficient hand tearability at any point of the adhesive-coated thermoplastic tape. In fact, the tear edge can be oriented linearly at any angle, or arcuately or stepped, if desired.

An important characteristic of a thermoplastic adhesive-coated tape for certain applications is the low degree of water vapor permeability or moisture porosity, when the tape is used in certain protective sealing applications. The instant invention adhesive-coated thermoplastic perforated and embossed tape exhibits a very low level of water vapor permeability. This is due primarily to the unique, very thin discrete perforations, which essentially "self seal" following their formation. Another factor of importance in this regard, (i.e., reduced water vapor permeability), is the presence of a highly water vapor impermeable adhesive coating applied to the rear surface of the thermoplastic film substrate. This adhesive coating thus also aids in the moisture sealing effect exhibited by the plurality of discrete perforated, but apposed regions.

SUMMARY OF THE INVENTION

An object of the present invention is to provide an adhesive-coated thermoplastic film tape having improved hand tearability characteristics.

Another object of the present invention is to provide an adhesive-coated thermoplastic film tape that is both perforated and embossed to allow for improved hand tearability in a transverse or other direction, without the requisite use of a cutting implement or tape dispenser.

Yet another object of the instant invention is to provide an adhesive-coated thermoplastic film tape that is at once readily hand-tearable and is suitable for low cost production in large quantities.

The foregoing and other objects are readily accomplished by the present invention which encompasses various exemplary embodiments of thermoplastic film adhesive-coated tapes.

The present invention tape comprises a flexible, elongate thermoplastic film substrate which is also the adhesive base. The essentially thin thermoplastic film base has both a front and a rear surface with two essentially straight and uninterrupted edges. The front and rear surfaces are oriented essentially coplanarly. The film base incorporates a plurality of discrete perforations throughout its entire structure. The rear surface is coated with a suitable pressure-sensitive adhesive layer. The front, non-adhesive-coated surface, if desired, is further configured with a plurality of discrete depressions or embossments impressed thereon.

In an exemplary embodiment of the present invention, the adhesive-coated thermoplastic film tape during use will not elongate to any significant degree upon application of a transverse tearing force thereto. In fact, an essentially straight, readily adhesive, non-curling edge will result. The front surface, as a result of the embossment thereon, further exhibits a clothlike texture and appearance, and is also soft, conformable and pliable during its use.

A method is also provided herein of producing an adhesive-coated thermoplastic film tape that is readily hand-tearable, comprising the steps of: imparting movement to an adhesive-coated thermoplastic tape web, and then impacting and thereby perforating said moving adhesive-coated thermoplastic tape web with a perforating means, and finally, if desired, subsequently impacting said now perforated adhesive-coated thermoplastic tape web with an embossing means.

BRIEF DESCRIPTION OF THE DRAWINGS

In order that the present invention may be more fully and readily understood, and so that further features thereof may be appreciated, the invention will now be described by way of example with reference to the accompanying drawings, in which like reference characters are used throughout in order to designate like parts, and in which.

DETAILED DESCRIPTION OF THE PREFERRED EMBODIMENT

Figure 1:
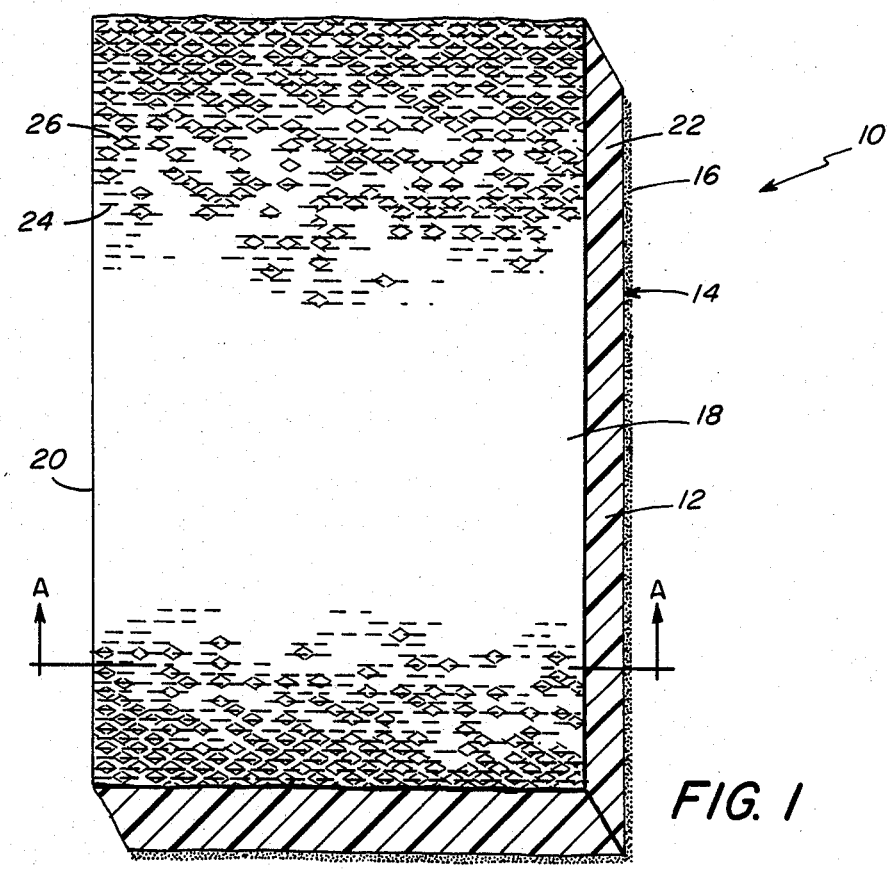
FIG. 1 is an enlarged diagrammatic plan view of a partial segment of an adhesive-coated thermoplastic film tape being an exemplary embodiment of the present invention.

Referring now to FIG. 1, which is an enlarged diagrammatic plan view of a partial segment of an adhesive-coated thermoplastic film tape being an exemplary embodiment of the present invention.

As shown in FIG. 1, the adhesive-coated thermoplastic tape of the present invention is depicted generally as 10. The thermoplastic film base or support is shown as 12. The film base or support 12 has a rear surface shown here as 14.

Coated onto the rear surface 14, is a continuous coating of a suitable pressure-sensitive adhesive, indicated as 16.

The continuous pressure-sensitive adhesive coating 16 is coated onto the rear surface 14 of the thermoplastic film substrate 12, preferably prior to the perforating and embossing steps in the method that will be more fully described at a later point.

The surface opposite to, and coplanar with, the rear surface 14, is referred to as the front surface, and is depicted here as 18. The thermoplastic tape 10 is an elongate, flexible structure, that is bounded by two essentially parallel, and uninterrupted edges, depicted as 20 and 22.

The thickness of the thermoplastic film substrate 12 may vary greatly. However, it has been determined that a film substrate 12 thickness of from 2 to 10 mil results in a tape having the requisite characteristics.

Figure 2:
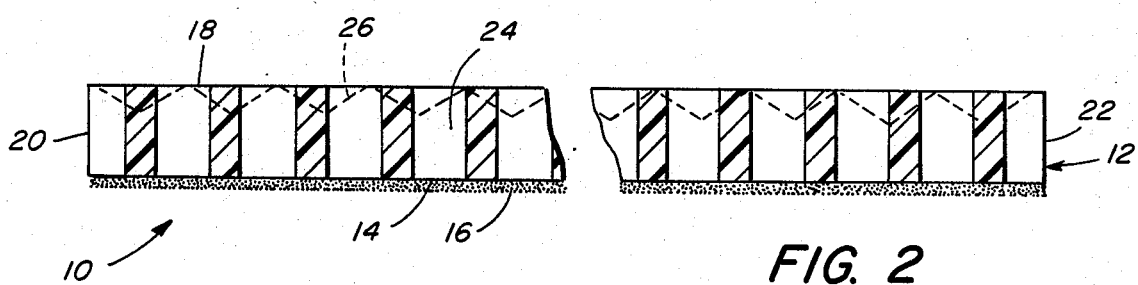
FIG. 2 is a diagrammatic cross-sectional view of an exemplary embodiment of the present invention taken along lines A—A of FIG. 1.

FIG. 2 is a diagrammatic, cross-sectional view of an exemplary embodiment of the adhesive-coated tape of the present invention, taken along lines A—A of FIG. 1.

A plurality of discrete perforations, shown here as 24, is found interspersed throughout the thermoplastic film base 12. The perforations 24 are preferably arranged or oriented in linear parallel rows. The perforations 24 extend, in most applications, from edge 20 to edge 22.

Further, the length of the discrete perforations 24 may vary significantly depending upon the width of the tape, as well as the application. However, it is noted that a ratio of perforation length to non-perforated open space region of about one to one (1:1) results in the optimization of hand-tearability of the perforated thermoplastic film tape of the present invention.

Increases in the ratio of open space/perforation length, i.e., more perforated area and less open space, will result in greater ease of hand-tearability with, however, a concomittant loss of the tensile strength of the thermoplastic film tape.

Figure 3A:
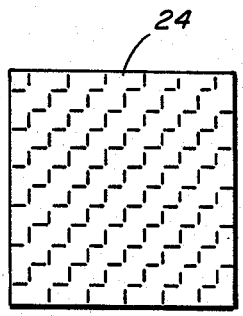
FIGS. 3A, 3B and 3C depict representative variant perforation patterns found in exemplary embodiments of the present invention.
Figure 3B:
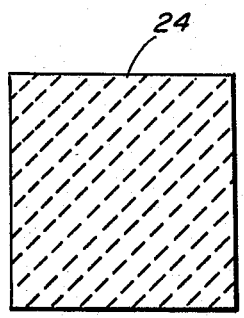
Figure 3C:
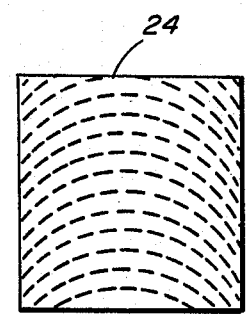

FIGS. 3A, 3B and 3C depict representative variant perforation patterns found in exemplary embodiments of the present invention.

It is to be noted that the configuration or orientation of the perforations 24 may be other than linear. In fact, orientations of the perforations other than at right angles to edges 20 and 22 are envisioned, e.g. stepped (seen in FIG. 3A), diagonally (seen in FIG. 3B), arcuate (seen in FIG. 3C), or randomly arranged (not shown).

Incorporated throughout the thermoplastic film base 12, if desired, and evident by numerous depressions upon the front surface 18 of the film base 12, are a plurality of embossments, depicted here as 26. The embossments 26 may be arranged in either a linear or other geometric pattern, or, if desired, in a random configuration.

The indented or depressed portions, representing the embossments 26, may be preferably either clearly defined in a geometric pattern, or in some instances, exhibit an essentially irregularly-shaped or amorphous appearance.

The embossments produced may have a depression depth that varies greatly, depending upon both the substrate material as well as the intended application. However, it has been found that a depression depth ranging from between one and ten percent of the total thickness of said thermoplastic film substrate 12 is most preferable.

As noted earlier, the effects of the application of embossing to the already perforated tape results in a tape that is readily hand-tearable and exhibits a cloth-like texture and appearance, that is at once soft, conformable and pliable during its use.

Further, regular linear orientation of the embossments 26 results in an improved hand-tearability, while conversely, non-orientation of the embossed rows will lead to poorer hand-tearability characteristics.

The thermoplastic film base substrate 12, preferably may be a material selected from the group consisting of polyethylene, polypropylene, polyurethane, polyesters, and polyvinylchloride, or the like, polymeric material. A requisite feature of the selected polymeric material to be utilized is the capacity for the discrete perforations 24 to essentially "self seal", following their production, by an apposition of the severed perforation edges, resulting in an essentially closed, and water vapor non-permeable state of the region surrounding each individual perforation 24 in the plurality, or array, of discrete perforations 24.

The method of an exemplary embodiment of the present invention to be described in applicable in either calendering or co-extrusion tape manufacturing systems.

Figures 4, 4A:
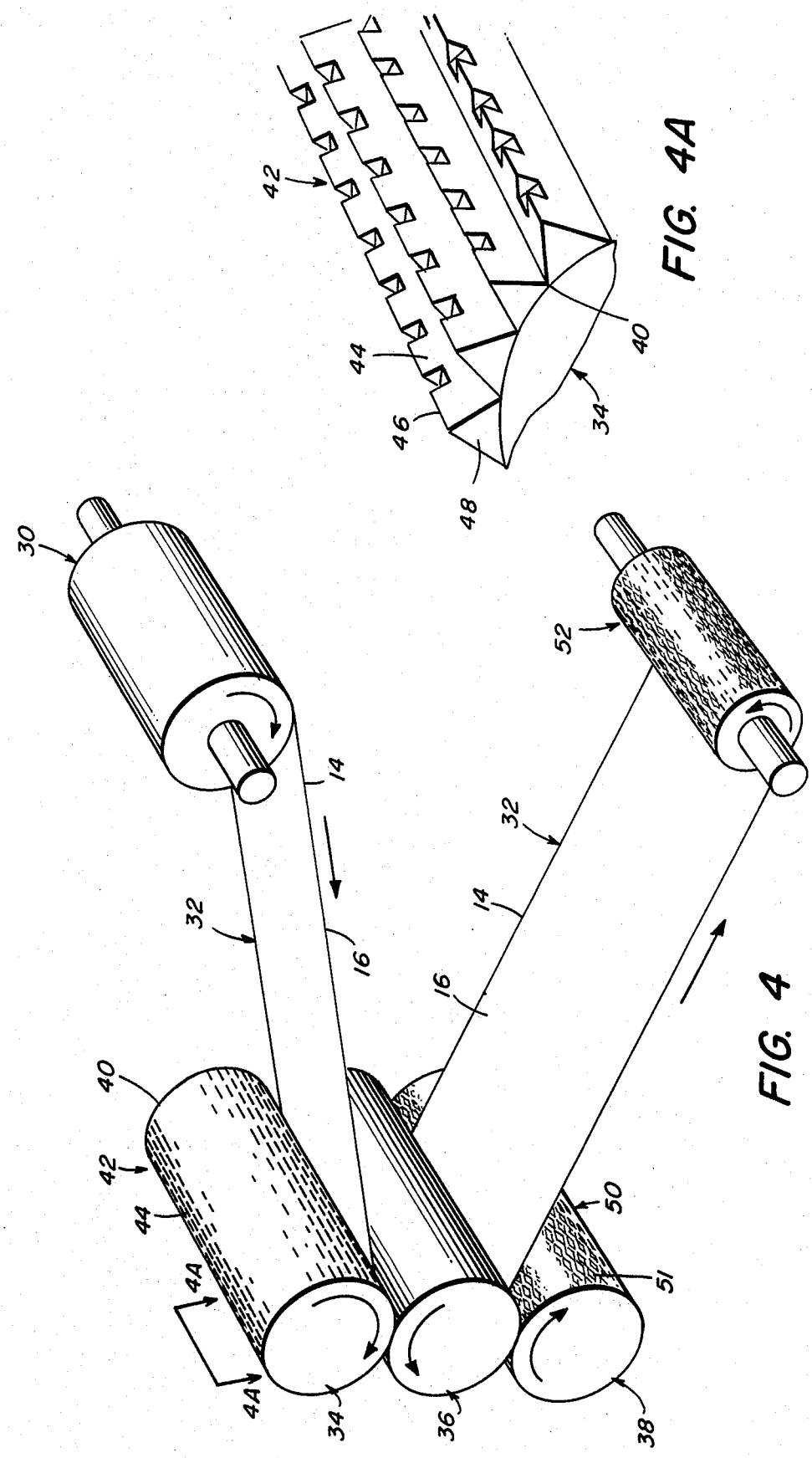
FIG. 4 is a diagrammatic side and top plan view of an adhesive-coated thermoplastic film tape-producing apparatus incorporating an exemplary embodiment of the present invention adapted for various processes.
FIG. 4A is an enlarged, diagrammatic elevational view of a segment of the perforating means of an exemplary embodiment of the present invention.

FIG. 4 is a diagrammatic side and top plan view of an adhesive-coated thermoplastic film tape-producing apparatus, incorporating an exemplary embodiment of the present invention as adapted for various processes.

In FIG. 4, a previously adhesive-coated non-perforated, thermoplastic film web 32 is seen stored on a thermoplastic film web feed reel, indicated here as 30. Arrows are emplaced to indicate both the direction of movement of the thermoplastic adhesive-coated film web 32, as well as the film contacting rollers 34, 36 and 38 (to be discussed later).

The periphery or the outer surface 40 of the film perforating roller 34, is the site of attachment of a plurality of discrete film perforating elements 44, which are preferably arranged in perforating arrays 48, or may be engraved in the outer surface 40 of the film perforating roller 34.

FIG. 4A is an enlarged diagrammatic elevational view of a segment of the perforating means of an exemplary embodiment of the present invention.

The perforating means, depicted here generally as 42, comprises a plurality of mounted discrete film perforating elements 44 situated on the outer or peripheral surface 40 of the film perforating roller 34, or may be engraved in the outer surface 40 of the film perforating roller 34. The film perforating elements 44, may be preferably either individually mounted, or, as shown here, interconnectedly mounted in film perforating element arrays 48, consisting of interconnected or attached film perforating elements 44, with each element 44 further incorporating a discrete film perforating blade 46.

As the adhesive-coated thermoplastic film web 32 travels into contact with, and between, the web contact roller 36, and the film perforating roller 34, the non-adhesive-coated surface 18 of the film web 32, is contacted by the plurality of discrete perforating blades 46 mounted onto the peripheral or outer surface 40 of the film perforating roller 34, or which have been engraved in the outer surface 40 of the film perforating roller 34.

This results in the production of a plurality of discrete film perforations 24 that are incorporated within the thermoplastic film base 12.

The desired orientation or arrangement of the perforations 24 is accomplished by previously orienting the plurality of discrete film perforating blades 46, that are mounted onto the outer surface 40 of the film perforating roller 34, or which have been engraved in the outer surface 40 of the film perforating roller 34.

It should be noted that in the preferred embodiment, the perforations 24 will pass through the entire thickness of the thermoplastic film base 12, and not through the adjacent pressure-sensitive adhesive material 16. In other applications, one may prefer to perforate through both the thermoplastic film base 12, as well as partially or entirely through the adherent pressure-sensitive adhesive material 16. This variation is also envisaged by the method of the present invention.

The non-permeable water vapor transmission characteristic of the adhesive-coated thermoplastic film tape of the prsent invention is maintained by both the rapid apposition and self-sealing effect of the severed perforation 24 edges, as well as by the presence of the water vapor non-permeable pressure-sensitive adhesive material 16.

Following the above-described perforation step, preferably, and if desired in a particular application, the now perforated adhesive-coated tape web 32 passes between, and in contact with, the web contact roller 36, and the peripheral surface 50 of the film embossing roller 38.

Affixed to the outer or peripheral surface 50 of the film embossing roller 38, is a plurality of discrete film embossing elements 51. The film embossing elements 51 may have a distinct geometric configuration, if desired.

The impacting of the perforated tape web 32 by the embossing elements 51 results in a pattern of embossments 26 upon the tape web 32 non-adhesive-coated front surface 18.

The now perforated and embossed adhesive-coated tape web 32 then is transported to a perforated tape web storage reel 52, awaiting final slitting of the tape web 32 into tape segments.

Figure 5:
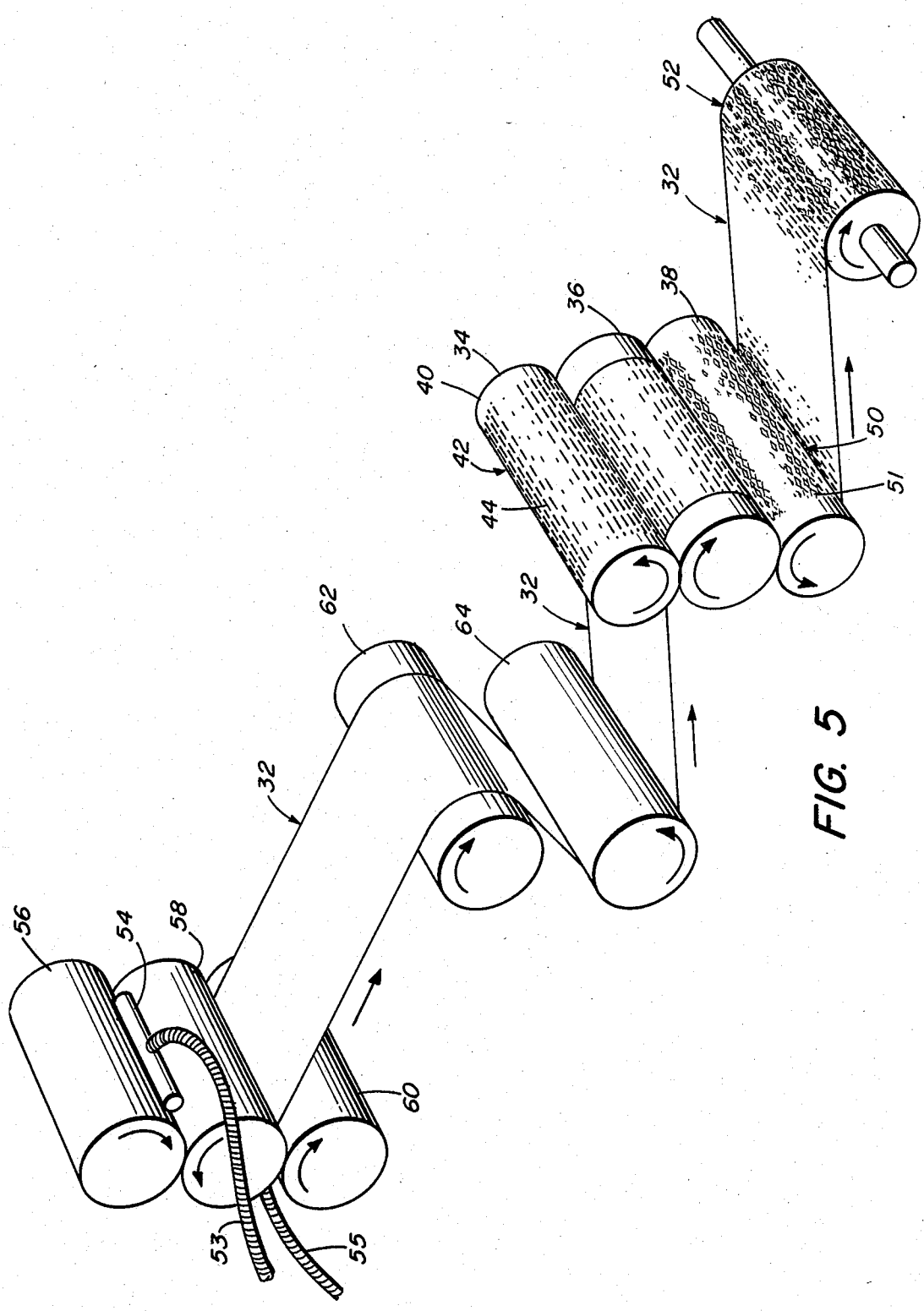
FIG. 5 is a diagrammatic side and top plan view of an adhesive-coated thermoplastic film tape-producing apparatus incorporating an exemplary embodiment of the present invention adapted for a calendering, or the like, process.

FIG. 5 is a diagrammatic side and top plan view of an adhesive-coated thermoplastic film tape-producing apparatus incorporating an exemplary embodiment of the present invention adapted for a calendering, or the like, process.

Arrows are emplaced in FIG. 5 to indicate both the direction of movement of the formed adhesive-coated film web 32, as well as the plurality of rollers (to be described later) utilized in this embodiment of the present invention.

Molten polymeric substrate material is being supplied by tube 53, and injected by an applicator 54 between rotating thermoplastic film forming rollers 56 and 58.

A suitable pressure-sensitive adhesive material 16 in a molten state is being fed by means of tube 55 to an applicator (not shown) between rotating thermoplastic film forming rollers 58 and 60 where it forms an adhesive coating on the thermoplastic film web.

The still hot, but now substantially formed adhesive-coated thermoplastic film web 32 is subsequently transported into contact with film web cooling rollers 62 and 64, at which point the adhesive-coated thermoplastic film web 32 is cooled to or below ambient temperature.

The film web 32 then is transported into contact with a film perforating roller 34, web contact roller 36, and film embossing roller 38, the functions and attributes of which have been thoroughly discussed in the description of FIG. 4 above.

The now perforated and embossed adhesive-coated tape web 32, as described above, is transported to a perforated tape web storage reel 52, awaiting final slitting of the tape web 32 into tape segments.

The foregoing detailed description of the preferred embodiments of the present invention is given for purposes of clarity of understanding only, and no unnecessary limitations should be understood or implied therefrom, as modifications may be obvious to those skilled in the art.

What is claimed is:

1. A method of producing an adhesive-coated thermoplastic film tape having an adhesive on one side thereof, the tape being readily hand-tearable, comprising the steps of:

imparting movement to an adhesive-coated thermoplastic film tape web; perforating said adhesive-coated thermoplastic film tape web with a perforating means comprising an interrupted linear cutting blade mounted onto or engraved into a roller means; and impacting said perforated adhesive-coated thermoplastic film tape web with an embossing means, on the side opposite the adhesive, comprising embossing elements fixedly mounted onto or engraved into a roller means.

* * * * *